No. 704,293. Patented July 8, 1902.
H. A. BIERLEY.
INSECT TRAP.
(Application filed Apr. 25, 1902.)
(No Model.)
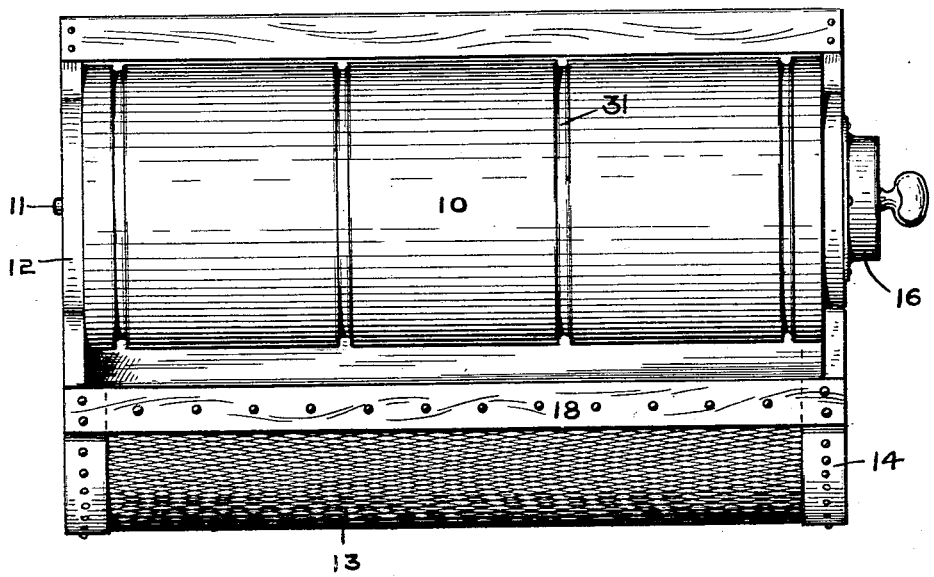
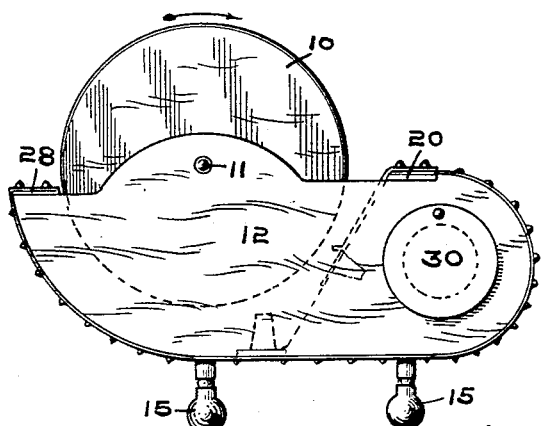
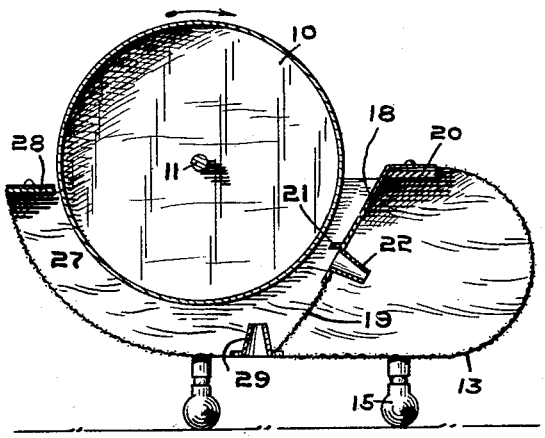
WITNESSES:
F. W. Woerner,
Nellie Allemong.
INVENTOR
Henry A. Bierley
BY
V. H. Lockwood
ATTORNEY.
THE NORRIS PETERS CO., PHOTO-LITHO., WASHINGTON, D. C.

UNITED STATES PATENT OFFICE.

HENRY A. BIERLEY, OF INDIANAPOLIS, INDIANA, ASSIGNOR TO THE HOUSEHOLD MANUFACTURING COMPANY, OF INDIANAPOLIS, INDIANA, A CORPORATION OF INDIANA.

INSECT-TRAP.

SPECIFICATION forming part of Letters Patent No. 704,293, dated July 8, 1902.

Application filed April 25, 1902. Serial No. 104,701. (No model.)

*To all whom it may concern:*

Be it known that I, HENRY A. BIERLEY, of Indianapolis, county of Marion, and State of Indiana, have invented a certain new and useful Insect-Trap; and I do hereby declare that the following is a full, clear, and exact description thereof, reference being had to the accompanying drawings, in which like figures refer to like parts.

The object of this invention is to make an improved form of trap for flies and similar insects.

Broadly stated, the invention consists of a bait-cylinder horizontally mounted, with means to keep it rotating, and a casing with the lower part translucent, in which the lower part of the cylinder turns, so that the flies that gather on top of the cylinder to eat any bait placed thereon will continue thereon by reason of the light below until they are carried into the casing and be unable to return. To attract the flies, the cylinder is made of bright tin or other bright and attractive material, and the bait is carried in depressions in the cylinder. A second chamber beside the lower part of the cylinder is provided for the flies.

The exact nature of said invention will be understood from the accompanying drawings and the following description and claims.

In the drawings, Figure 1 is a plan view of the fly-trap containing the features of my invention. Fig. 2 is an elevation of the left hand thereof. Fig. 3 is a vertical cross-section through the device.

The fly-trap shown in the drawings consists of a cylinder 10, mounted horizontally in a stationary casing below and which supports the cylinder. The cylinder is carried on the rod 11, that has bearings in the ends 12 of the casing. The ends 12 are made, preferably, of wood, and the sides and bottom of the casing are made of translucent wire-netting 13, the ends of which are bound to the ends 12 of the casing by the metal strips 14. The casing is supported upon legs 15, which hold it elevated. The cylinder is rotated in the direction indicated by the arrows by any suitable means, that shown being a spring-motor 16, regulated by a clockwork mechanism forming a part thereof, which motor is old and common for actuating things, and the details thereof are not herein shown or described, as this invention is not limited to any particular means for rotating the cylinder. The width of the casing is greater than the diameter of the cylinder, and only the lower half of the cylinder extends into said casing. There are two chambers in said casing—the outer or cylinder chamber 27, in which the cylinder rotates, and the inner chamber 17 for holding the flies coming from the outer chamber. These chambers in the casing are separated by a partition, the upper part of which is formed of a metal plate 18 and the lower part of wire-netting 19. The upper part or plate 18 is secured to a reinforcing horizontal bar 20, that extends from one side of the casing to the other for supporting the inturned upper edge of the wire-netting 13. Said plate 18 is inclined downwardly somewhat toward the cylinder and has a guard-plate 21, that extents toward the cylinder, so as to prevent the flies from escaping from the chamber 27 in which the cylinder is mounted, but is spaced far enough from the cylinder to permit flies on the cylinder to pass it. Immediately below said guard-plate 21 there is a series of large openings leading from the outer chamber 27 to the inner chamber 17 through solid conical tubes 22, and through which flies may readily pass into said inner chamber. The tubes 22 face the translucent wall of the inner chamber on the right. The outer surface of the plate 18 is preferably made bright and the inner surface dark, and the conical tubes 22 being contracted at their inner ends the flies will not escape.

The chamber 27, in which the cylinder is mounted, is closed to hold the flies on one side by said guard-plate 21 and on the other side by the guard-plate 28, that approaches the cylinder very closely. Flies may enter the antechamber independently of the cylinder through a series of openings formed in the bottom by the conical tubes 29. A door 30 is made in the end of the casing to give access to the chamber 17 for cleaning or for any other purpose.

In using the device it is preferably placed near a window with the right-hand side, as shown in Fig. 3, next to the window. However, it can be used elsewhere. Syrup or other suitable bait is placed on the cylinder, preferably in the grooves 31. When the motor is wound up, the cylinder will rotate in the direction indicated by the arrows and will carry the flies that alight upon the cylinder into the chamber 27. They will not fly away as they enter the chamber 27, because the plate 18 is bright, and the lower part of the partition 19, as well as the bottom of the casing, is made of wire-netting or other translucent material. After the fly enters the chamber 27 he cannot escape, as the guard-plate 28 will prevent him from following the cylinder. If the fly goes in the other direction to the right, he will climb the wire-netting 19 in the partition between the chambers 27 and 17 until he reaches the guard-plate 21, whereupon he will move to the left and enter a conical tube 22, because its inner end faces the light, inasmuch as the right-hand side of the chamber 17 is formed of wire-netting or other translucent material. This part of the device is made in order that the flies may pass from the chamber 27 into the chamber 17, and it thereby increases the capacity of the device. Flies that crowd about the device and crawl under it will pass upward through the inlet-tubes 29, and thereby enter the chamber 27, being led to do so by the bright baited cylinder above said inlet-openings. By having the fly-chambers below the upper half or more of the top surface of the cylinder is exposed for flies to alight upon.

What is claimed to be the invention, and desired to be secured by Letters Patent, is—

1. A trap of the class described including a rotary cylinder with depressions in its surface for bait, and a casing into which a portion of the cylinder extends for entrapping the insects as the cylinder rotates.

2. A trap of the class described including a rotary cylinder made of bright material with depressions in its surface for bait, and a casing into which a portion of the cylinder extends for entrapping the insects as the cylinder is rotated.

3. A trap of the class described including a casing having two chambers, one closed and the other open at the top and separated by a partition having openings leading from the open chamber into the closed chamber, the bottom of said chambers, the outer side of the closed chamber, and the partition below the openings therethrough being made of translucent material, a rotary bait-cylinder horizontally mounted in said open chamber with one side adjacent the partition between said chambers, and a guard-plate secured to the partition immediately above the openings therein and extending toward said cylinder.

4. A trap of the class described including a cylinder with grooves therein for bait, a casing in which said cylinder is horizontally mounted having a chamber in which the lower part of the cylinder extends, leaving the upper half of the cylinder exposed and the bottom of the casing being formed of translucent material and on one side the wall of said chamber closely approaching the cylinder, a guard-plate closing the other side of said chamber which extends toward the cylinder but is spaced therefrom far enough to permit insects on said cylinder to pass it, and means for rotating the cylinder.

5. A trap of the class described including a casing forming a chamber with the upper part open and the lower part made of translucent material, a cylinder mounted in said casing and having its lower portion extending into said chamber, said cylinder being provided with depressions in its surface for bait, means for rotating the cylinder, a guard-plate closing said chamber at one side of the cylinder but spaced sufficiently from the latter to permit insects on the cylinder passing into the chamber, and a guard-plate on the other side of the cylinder and closely approaching the latter.

6. A trap of the class described including a chamber one side of which is formed of translucent material and the opposite side of which is provided with a plate having openings through which the insects may pass, a rotary cylinder mounted adjacent to the side of the chamber having said openings, said cylinder being provided with depressions in its surface for bait, and a guard-plate arranged above said openings for directing the insects thereto.

7. A trap of the class described including a stationary casing with its bottom and side formed of wire-netting, a cylinder mounted horizontally with the lower portion extending into said casing, means for rotating said cylinder, a partition extending longitudinally of the casing for forming a chamber separated from the casing, the lower portion of which is made of translucent material and has openings through it for the passage of insects, and a guard-plate extending from the non-translucent portion of said partition immediately above the openings that approaches the cylinder.

8. A trap of the class described having a casing forming a chamber open at the top, a bait-cylinder made of bright material horizontally mounted in said chamber and closing the same, means for rotating the cylinder, means for supporting the casing in an elevated position, openings through the bottom of the casing through which insects may enter, and a closed chamber beside said open chamber and having openings leading from the open chamber, the bottom and side of said closed chamber being made of translucent material.

9. A trap of the class described including a casing having two longitudinally-extending chambers one open at the top the sides and bottoms of the chambers being formed of wire-netting, a longitudinal partition for separating the chambers the upper portion of which is formed of a bright plate with a series of conical passage-ways through said plate from the open chamber to the other chamber, a cylinder horizontally mounted with the lower portion extending into said open chamber and closing the same, means for rotating the cylinder, a guard-plate extending from the partition at a point above the openings therethrough toward the cylinder but spaced from the cylinder far enough to permit insects on the cylinder to pass it, means for supporting the casing in an elevated position, and a series of conical openings through the bottom of the casing leading into the chamber containing said cylinder.

In witness whereof I have hereunto affixed my signature in the presence of the witnesses herein named.

HENRY A. BIERLEY.

Witnesses:
FLORENCE E. BRYANT,
V. H. LOCKWOOD.